US012179493B2

(12) United States Patent
Deng et al.

(10) Patent No.: US 12,179,493 B2
(45) Date of Patent: Dec. 31, 2024

(54) HEAD UNIT, PRINTING SYSTEM AND PRINTING METHOD

(71) Applicant: BROTHER KOGYO KABUSHIKI KAISHA, Nagoya (JP)

(72) Inventors: Yuanyuan Deng, Nagoya (JP); Kohei Watanabe, Nagoya (JP)

(73) Assignee: BROTHER KOGYO KABUSHIKI KAISAH, Nagoya (JP)

( * ) Notice: Subject to any disclaimer, the term of this patent is extended or adjusted under 35 U.S.C. 154(b) by 226 days.

(21) Appl. No.: 18/060,422

(22) Filed: Nov. 30, 2022

(65) Prior Publication Data

US 2023/0173810 A1 Jun. 8, 2023

(30) Foreign Application Priority Data

Dec. 3, 2021 (JP) ................................ 2021-197298

(51) Int. Cl.
*B41J 2/175* (2006.01)
*B41J 2/14* (2006.01)

(52) U.S. Cl.
CPC ......... *B41J 2/17553* (2013.01); *B41J 2/1433* (2013.01); *B41J 2/17509* (2013.01); *B41J 2002/14491* (2013.01)

(58) Field of Classification Search
CPC .. B41J 2/17553; B41J 2/1433; B41J 2/17509; B41J 2002/14491; B41J 2002/1437; B41J 2002/14379; B41J 2002/1487
See application file for complete search history.

(56) References Cited

U.S. PATENT DOCUMENTS 4,628,332 A * 12/1986 Matsumoto .............. B41J 25/34 347/49

FOREIGN PATENT DOCUMENTS

JP 2021-070178 A 5/2021

OTHER PUBLICATIONS

European Patent Office, Office Action issued in European Patent Application No. 22210528.0, dated Jan. 8, 2024 (4 pages).
European Patent Office, Extended European Search Report issued in European Patent Application No. 22210528.0, mailed Apr. 4, 2023.

* cited by examiner

*Primary Examiner* — Geoffrey S Mruk
(74) *Attorney, Agent, or Firm* — Baker Botts L.L.P.

(57) ABSTRACT

A head unit includes: a head having a nozzle surface spreading in a first direction and a second direction crossing the first direction, the nozzle surface having a nozzle row along the first direction; a tank fluidly connected to the head; a substrate electrically connected to the head; a casing containing the head, the tank and the substrate; and an edge member defining an opening through which a tube fluidly connectable to the tank and a wiring electrically connectable to the substrate pass, the edge member being detachably attachable with respect to the casing, wherein the edge member is attachable with respect to the casing selectively in a first state in which the opening faces in a third direction crossing the first direction and the second direction and a second state in which the opening faces in the first direction.

15 Claims, 10 Drawing Sheets

HEAD UNIT, PRINTING SYSTEM AND PRINTING METHOD

REFERENCE TO RELATED APPLICATIONS

This application claims priority from Japanese Patent Application No. 2021-197298 filed on Dec. 3, 2021. The entire content of the priority application is incorporated herein by reference.

BACKGROUND ART

Conventionally, there is known an ink-jet printer provided with an ink supplying unit and a head unit which is connected to the ink supplying unit by an ink channel such as a tube, etc. For example, in the ink-jet printer, an ink discharge surface (ink ejection surface) of a head unit is provided perpendicularly or vertically so as to perform printing on a side surface (vertical surface) of an object of printing. Further, an end of the ink channel is connected to a surface (vertical surface), of the head unit, which is on the opposite side to the ink discharge surface.

DESCRIPTION

Here, in a case that printing is to be performed on an upper surface of the object of printing by the ink-jet printer, it is necessary to orient the ink discharge surface downwardly. In a state that the ink discharge surface is oriented downwardly, since the side surface, which is on the opposite side to the ink discharge surface, namely the side surface to which the one end of the ink channel is connected, is oriented upwardly, a part of the ink channel projects or protrudes upward to a location above the head unit. Due to this, a certain space is required at the location above the head unit, which in turn leads to such a problem that a placement (arrangement) posture or a placement location of the head unit is restricted. Further, there arises also such a problem that the length of the ink channel is required to be made long because the part of the ink channel protrudes upwardly to the location above the head unit.

The present teaching has been made in view of the above-described problems, and an object of the present teaching is to provide a head unit, a printing system and a printing method each of which is capable of improving the degree of freedom of the placement posture and placement location of the head unit, while maintaining the length of the ink channel connecting the ink supplying unit and the head unit at a predetermined length.

According to a first aspect of the present teaching, there is provided a head unit including:

- a head having a nozzle surface spreading in a first direction and a second direction crossing the first direction, the nozzle surface having a nozzle row formed along the first direction;
- a tank fluidly connected to the head;
- a substrate electrically connected to the head;
- a casing containing the head, the tank and the substrate; and
- an edge member defining an opening through which a tube and a wiring pass, the tube being fluidly connectable to the tank, the wiring being electrically connectable to the substrate, the edge member being configured to be detachably attachable with respect to the casing,
- wherein the edge member is configured to be attachable with respect to the casing selectively in a first state and a second state, the first state being a state in which the opening faces in a third direction crossing the first direction and the second direction, the second state being a state in which the opening faces in the first direction.

According to a second aspect of the present teaching, there is provided a printing system including:

- an ink supplying device; and
- the head unit in accordance with the first aspect which is connected to the ink supplying device and to which ink is supplied from the ink supplying device.

According to a third aspect of the present teaching, there is provided a printing method including:

- conveying a print medium by a conveyor; and
- causing the head unit in accordance with the first aspect, or the printing system in accordance with the second aspect, to discharge ink onto the print medium conveyed by the conveyor.

According to the first to third aspects of the present teaching, it is possible to improve the degree of freedom of the placement posture and placement location of the head unit, while maintaining the length of the ink channel connecting the ink supplying unit and the head unit at a predetermined length.

In the following, an explanation will be given about an embodiment of a printing system according to the present teaching, with an ink-jet printer as an example.

Figure 1A:
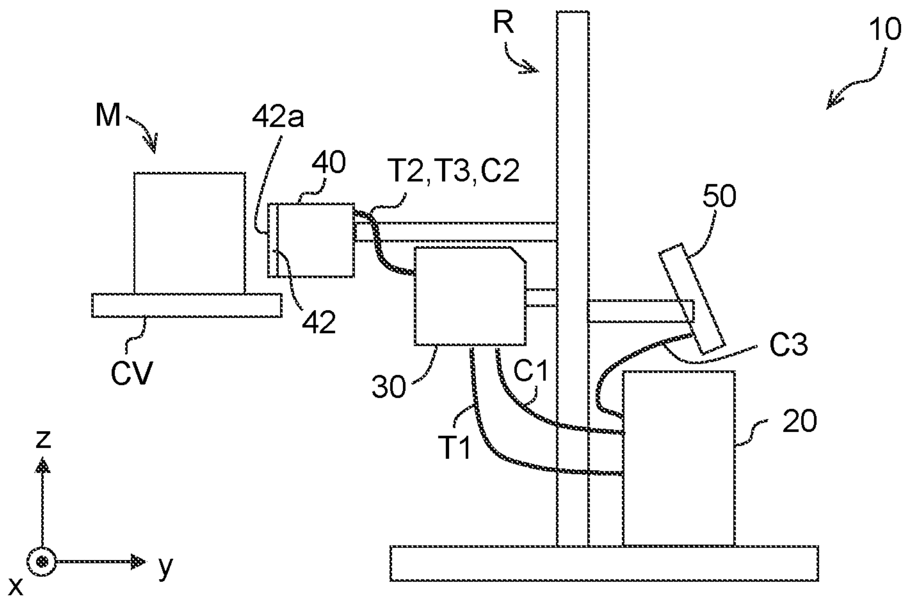
FIG. 1A is a view depicting a usage state of an ink-jet printer.
Figure 1B:
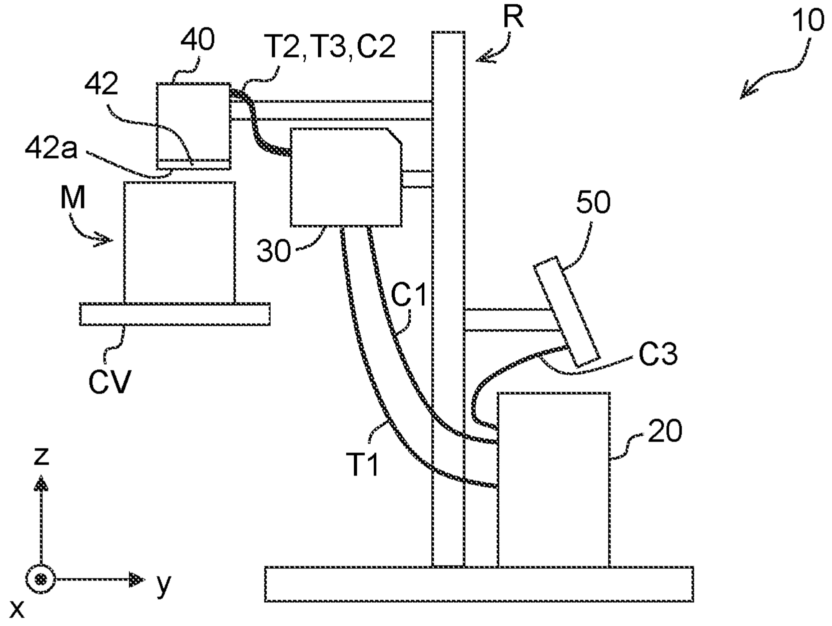
FIG. 1B is a view depicting another usage state of the ink-jet printer.

First, the overview of an ink-jet printer 10 will be explained, with reference to FIGS. 1A and 1B. Note that in the following explanation, a direction from a far side toward a front side of the sheet surface in FIGS. 1A and 1B is referred to as an x direction, a direction from the left side toward the right side of the sheet surface is referred to as a y direction, and a direction from the lower side toward the upper side of the sheet surface is referred to as a z direction. Namely, the x direction and the y direction are along a horizontal plane and are orthogonal to each other. The z direction is along the vertical direction and is orthogonal to the x direction and the y direction. Further, in each of the drawings, a side of a forward (tip) end of an arrow indicating the x direction is referred to as one side in the x direction, and a side of a base end of the arrow indicating the x direction is referred to as the other side of the x direction in some cases. A side of a forward end of an arrow indicating the y direction is referred to as one side in the y direction, and a side of a base end of the arrow indicating the y direction is referred to as the other side of the y direction in some cases. Further, a side of a forward end of an arrow indicating the z direction is referred to as one side in the z direction, and a side of a base end of the arrow indicating the z direction is referred to as the other side of the z direction in some cases.

As depicted in FIGS. 1A and 1B, the ink-jet printer 10 is mainly provided with a base unit 20, a tank unit 30, a head unit 40 and an operation panel 50. The base unit 20 and the tank unit 30 are connected by a tube T1 as an ink channel and a wiring cable C1. The tank unit 30 and the head unit 40 are connected by tubes T2 and T3 as the ink channel and a wiring cable C2. The operation panel 50 and the base unit 20 are connected by a wiring cable C3. The base unit 20, the tank unit 30, the head unit 40 and the operation panel 50 are fixed to a rack R to thereby have a relative positional relationship determined therefor.

The base unit 20 functions as an ink supplying device configured to supply an ink to the tank unit 30 via the tube T1. The tank unit 30 functions as a relaying device configured to supply the ink supplied from the base unit 20 to the head unit 40 via the tubes T2 and T3. Namely, the base unit 20 and the tank unit 30 function as an ink supplying system configured to supply the ink to the head unit 40. Further, the tank unit 30 and the head unit 40 function as a head system to which the ink is supplied from the base unit 20. The head unit 40 is provided with an ink-jet head 42, and a plurality of nozzles are formed in an ink discharge surface 42*a* of the ink-jet head 42. The ink-jet head 42 is configured to discharge or eject the ink, supplied from the tank unit 30, from the plurality of nozzles formed in the ink discharge surface 42*a*. As the ink-jet head 42, it is allowable to use, for example, a so-called piezoelectric ink-jet head provided with a plurality of nozzles, a plurality of individual channels each of which communicates with one of the plurality of nozzles, and a plurality of piezoelectric elements each of which applies a discharge pressure to the ink inside one of the plurality of individual channels.

In the present embodiment, the head unit 40 is configured to be attachable with respect to the rack R in a horizontal posture or a vertical posture. Here, the horizontal posture is a posture, as depicted in FIG. 1A, wherein the ink discharge surface 42*a* of the ink-jet head 42 is orthogonal to the y direction. In the horizontal posture, the ink is discharged from the ink discharge surface 42*a* in a horizontal direction (a direction opposite to the y direction). On the other hand, the vertical posture is a posture, as depicted in FIG. 1B, wherein the ink discharge surface 42*a* of the ink-jet head 42 is orthogonal to the z direction. In the vertical posture, the ink is discharged from the ink discharge surface 42*a* vertically downward (a direction opposite to the z direction). Here, it is presumed that a print medium M is conveyed in the x direction by a conveyor CV, as depicted in FIGS. 1A and 1B. In such a case, as depicted in FIG. 1A, by attaching the head unit 40 to the rack R in the horizontal posture, it is possible to perform printing on a side surface (side surface orthogonal to the horizontal plane) of the print medium M. On the other hand, by attaching the head unit 40 to the rack R in the vertical posture as depicted in FIG. 1B, it is possible to perform printing on an upper surface of the print medium M.

Figure 2:
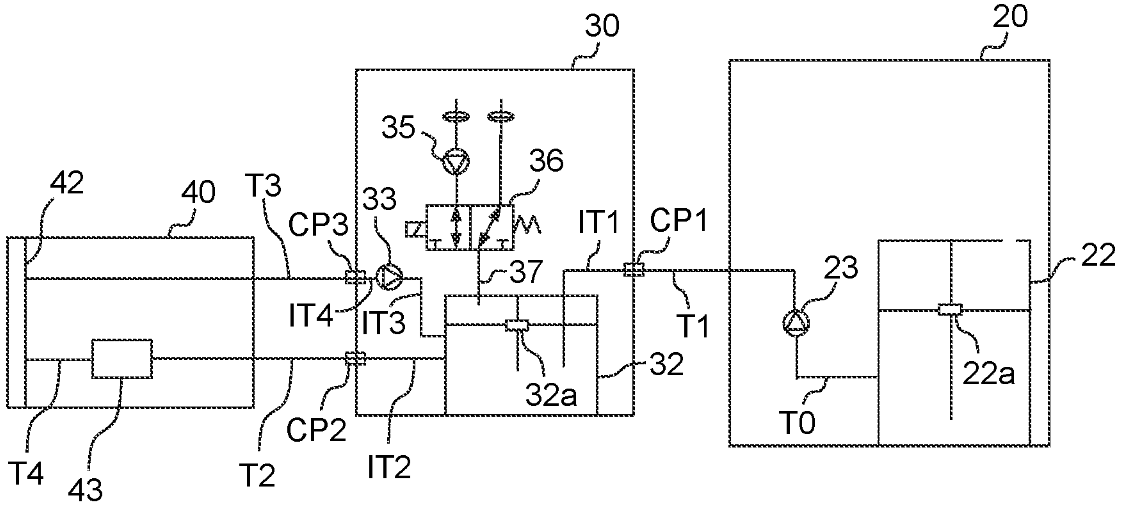
FIG. 2 is a view depicting an outline of an ink supplying system of the ink-jet printer.

Next, an ink supply system of the ink-jet printer 10 will explained. As depicted in FIG. 2, the base unit 20 is provided with a main tank 22 and a pump 23. The main tank 22 is installed inside the base unit 20. The main tank 22 is provided, for example, with a liquid surface detecting sensor 22*a* of a float type which is configured to detect the water level of the ink inside the main tank 22. Further, an atmosphere communicating hole is formed in the main tank 22, and the inside of the main tank 22 communicates with the atmosphere via the atmosphere communicating hole. Note that in the present embodiment, although the main tank 22 is installed inside the base unit 20, the main tank 22 may be configured to be detachable from the base unit 20 and exchangeable. Alternatively, it is also allowable to separately provide an exchangeable ink tank configured to communicate with the main tank 22 and to supply the ink to the main tank 22.

The tank unit 30 is provided with a head tank 32, a circulation pump 33, a purge pump 35, a solenoid valve 36 and an atmosphere communicating channel 37. The head tank 32 is installed inside the tank unit 30. The head tank 32 is provided, for example, with a liquid surface detecting sensor 32*a* of a float type which is configured to detect the water level of the ink inside the head tank 32. The atmosphere communicating channel 37 is provided with the purge pump 35 and the solenoid valve 36. Although the solenoid valve 36 normally allows the head tank 32 to communicate with the atmosphere, the solenoid valve 36 shuts off the communication between the head tank 32 and the atmosphere during a purge processing (to be described later on), and allows the head tank 32 and the purge pump 35 to communicate with each other. Accordingly, the head tank 32 communicates with the atmosphere, except for a period of time during which the purge processing is being executed.

The head unit 40 is provided with the ink-jet head 42 and a damper 43. The damper 43 is provided, for example, in order to mitigate any variation in pressure in the ink inside the ink-jet head 42 which occurs, for example, in such a case that a print medium conveyed by the conveyor skews and collides against the ink-jet head 42, etc.

The main tank 22 and the head tank 32 communicate with each other via a tube T0, a tube T1 and a tube IT1. One end of the tube T0 is connected to the main tank 22, and the other end of the tube T0 is connected to the pump 23. One end of the tube T1 is connected to the pump 23, and the other end of the tube T1 is connected to a coupler CP1 of the tank unit 30. Further, one end of the tube IT1 is connected to the coupler CP1 of the tank unit 30, and the other end of the tube IT1 is connected to the head tank 32.

The head tank 32 and the damper 43 of the head unit 40 communicate with each other via a tube IT2 and a tube T2. One end of the tube IT2 is connected to the head tank 32, and the other end of the tube IT2 is connected to a coupler CP2 of the tank unit 30. Further, one end of the tube T2 is connected to the coupler CP2 of the tank unit 30 and the other end of the tube T2 is connected to the damper 43.

The damper 43 and the ink-jet head 42 of the head unit 40 communicate with each other via a tube T4. Namely, one end of the tube T4 is connected to the damper 43 and the other end of the tube T4 is connected to the ink-jet head 42. Further, the ink-jet head 42 and the head tank 32 communicate with each other via a tube T3, a tube IT4 and a tube IT3. One end of the tube T3 is connected to the ink-jet head 42, and the other end of the tube T3 is connected to a coupler CP3 of the tank unit 30. One end of the tube IT4 is connected to the coupler CP3 of the tank unit 30, and the other end of the tube IT4 is connected to the circulation pump 33 of the tank unit 30. Further, one end of the tube IT3 is connected to the circulation pump 33 of the tank unit 30, and the other end of the tube IT3 is connected to the head tank 32.

At a time of initially introducing (installing) the ink-jet printer 10, the ink is not present inside the head tank 32 and inside the ink-jet head 42. Accordingly, at first, a controller 21 (to be described later on, see FIG. 3) drives the pump 23 so as to supply the ink from the main tank 22 to the head tank 32 via the tubes T0, T1 and IT1. Further, in a case that the liquid surface detecting sensor 32*a* of the head tank 32 detects that the water level of the ink inside the head tank 32 has reached an upper limit, the controller 21 stopes the pump 23. With this, the supply of the ink to the head tank 32 is stopped. Next, in a state that the ink discharge surface 42*a* of the ink-jet head 42 is covered by a non-illustrated cap, the controller 21 drives the circulation pump 33 via a relay substrate 31 (to be described later on; see FIG. 3) of the tank unit 30. With this, the ink flows in an order of: the tube IT2, the tube T2, the tube T4, the ink-jet head 42, the tube T3, the tube IT4, and the tube IT3, whereby the ink is filled in the ink-jet head 42 and in a channel connecting the ink-jet head 42 and the head tank 32. In a case that the ink is filled in the ink-jet head 42 and in the channel connecting the ink-jet head 42 and the head tank 32, the controller 21 stopes the circulation pump 33 via the relay substrate 31. With this, the supply of the ink to the ink-jet head 42 is stopped.

In a case that the ink is discharged or ejected from the ink-jet head 42 in a state that the ink is filled in the ink-jet head 42 and in the channel connecting the ink-jet head 42 and the head tank 32, an amount, of the ink, which is same as the amount of the ink discharged from the ink-jet head 42 is supplied from the head tank 32 to the ink-jet head 42 via the tubes IT2, T2 and T4. Then, in a case that the ink inside the head tank 32 is decreased by continuous discharge of the ink from the ink-jet head 42 and that the liquid surface detecting sensor 32*a* of the head tank 32 detects that the water level of the ink inside the head tank 32 has reached a lower limit, the controller 21 drives the pump 23. With this, the ink is supplied from the main tank 22 to the head tank 32 via the tubes T0, T1 and IT1. In a case that the ink inside the main tank 22 is decreased by supplying of the ink to the head tank 32 and that the liquid surface detecting sensor 22*a* of the main tank 22 detects that the water level of the ink inside the main tank 22 has reached a lower limit, the controller 21 causes, for example, the operation panel 50 to display a message urging replenishing of the ink with respect to the main tank 22. Then, an user, who has seen the message urging the replenishing of the ink with respect to the main tank 22 replenishes the main tank 22 with the ink, thereby making it possible to supply the ink from the main tank 22 to the head tank 32 again.

Note that in the present embodiment, in order to exhaust (discharge), from the plurality of nozzles of the ink discharge surface 42*a*, a viscous ink inside the ink-jet head 42, or an air bubble entered into and mixed with the ink inside the ink-jet head 42 and inside the tubes IT2, T2 and T4, the controller 21 executes, in some cases, a purge processing of forcibly supplying the ink from the head tank 32 to the ink-jet head 42. In the purge processing, the controller 21 controls the solenoid valve 36 so as to shut off the communication between the head tank 32 and the atmosphere and to allow the head tank 32 to communicate with the pure pump 35. Further, the controller drives the purge pump 35 via the relay sub state 31 in this state, to thereby make the pressure inside the head tank 32 to be in the positive pressure. By doing so, the ink is forcibly supplied from the head tank 32 to the ink-jet head 42 via the tube IT2, T2 and T4, thereby exhausting the viscous ink and/or the air bubble inside the ink-jet head 42 from the plurality of nozzles.

Figure 3:
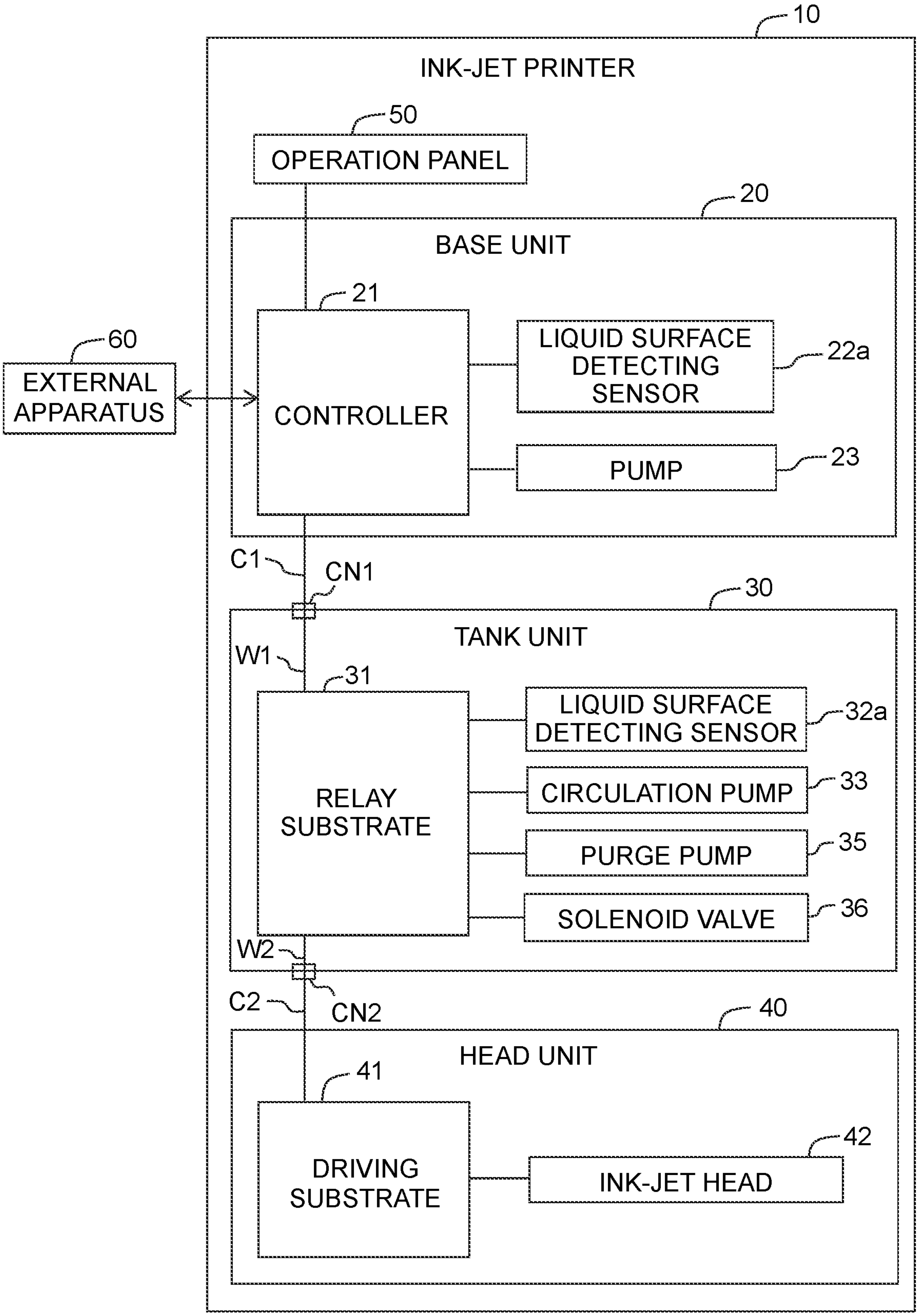
FIG. 3 is a view depicting an outline of the electrical connection among a base unit, a tank unit, a head unit, an operation panel and an external apparatus.

Next, an explanation will be given about the electric connecting relationship among the base unit 20, the tank unit 30, the head unit 40 and the operation panel 50. As depicted in FIG. 3, the base unit 20 is provided with the controller 21; the controller 21 is electrically connected to the liquid surface detecting sensor 22*a* and the pump 23. Further, the controller 21 is electrically connected to the operation panel 50 as an input-output interface with respect to a user. The tank unit 30 is provided with the relay substrate 31; the relay substrate 31 is electrically connected to the liquid surface detecting sensor 32*a*, the circulation pump 33, the purge pump 35 and the solenoid valve 36. Further, the relay substrate 31 is electrically connected to the controller 21 of the base unit 20 via a wiring cable W1 and the wiring cable C1. One end of the wiring cable W1 is connected to the relay substrate 31, and the other end of the wiring cable W1 is connected to a connector CN1 of the tank unit 30. Further, one end of the wiring cable C1 is connected to the connector C1 of the tank unit 30, and the other end of the wiring cable CN1 is connected to the controller 21. The head unit 40 is provided with a driving substrate 41; the driving substrate 41 is electrically connected to ink-jet head 42. Further, the relay substrate 31 of the tank unit 30 and the driving substrate 41 are electrically connected to each other via a wiring cable W2 and the wiring cable C2. One end of the wiring cable W2 is connected to the relay substrate 31, and the other end of the wiring cable W2 is connected to a connector CN2 of the tank unit 30. Further, one end of the wiring cable C2 is connected to the connector CN2 of the tank unit 30, and the other end of the wiring cable C2 is connected to the driving substrate 41.

The controller 21 is provided with a CPU (Central Processing Unit), a ROM (Read Only Memory), a RAM (Random Access Memory) and an ASIC (Application Specific Integrated Circuit) which includes a variety of kinds of control circuits, etc. The controller 21 executes a variety of kinds of processing in accordance with a program stored in the ROM and by the CPU and the ASIC. For example, the controller 21 generates a control signal based on a print job received from an external apparatus 60 such as a PC, etc., and transmits the control signal to the driving substrate 41 via the relay substrate 31. Further, the driving substrate 41 generates a driving signal based on the control signal, and drives the ink-jet head 42 based on the driving signal, thereby executing a print processing of printing an image, etc., on the print medium M. Furthermore, the controller 21 controls the pumps 23 and 33, the purge pump 35, the solenoid valve 36, the operation panel 50, etc., based on signals each of which is outputted from one of the liquid surface detecting sensors 22*a* and 32*a*, thereby executing a supply processing of the ink and a maintenance processing with respect to the ink-jet head 42. Note that although the example in which the controller 21 performs the print processing by the CPU and the ASIC has been explained, the present teaching is not limited to or restricted by this. It is allowable to realize the controller 21 by any hardware configuration. For example, it is allowable that the processing is executed by the CPU only or the ASIC only. Alternatively, it is allowable to realize the function of the controller 21 in a divided manner by two or more pieces of the CPU and/or two or more pieces of the ASIC.

Figure 4A:
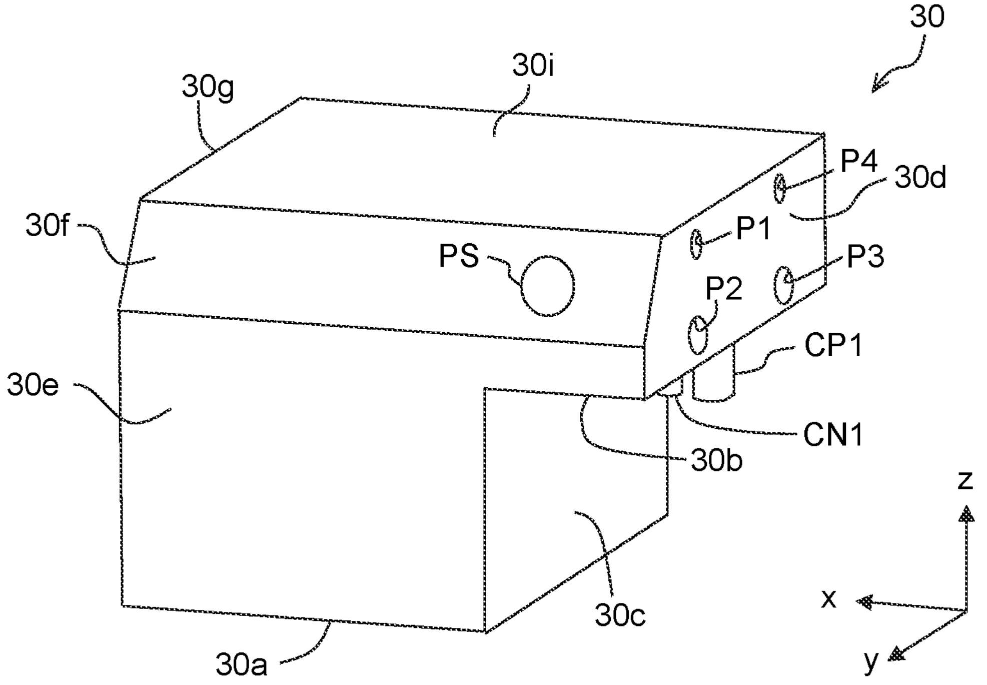
FIG. 4A is a perspective view of the tank unit.
Figure 4B:
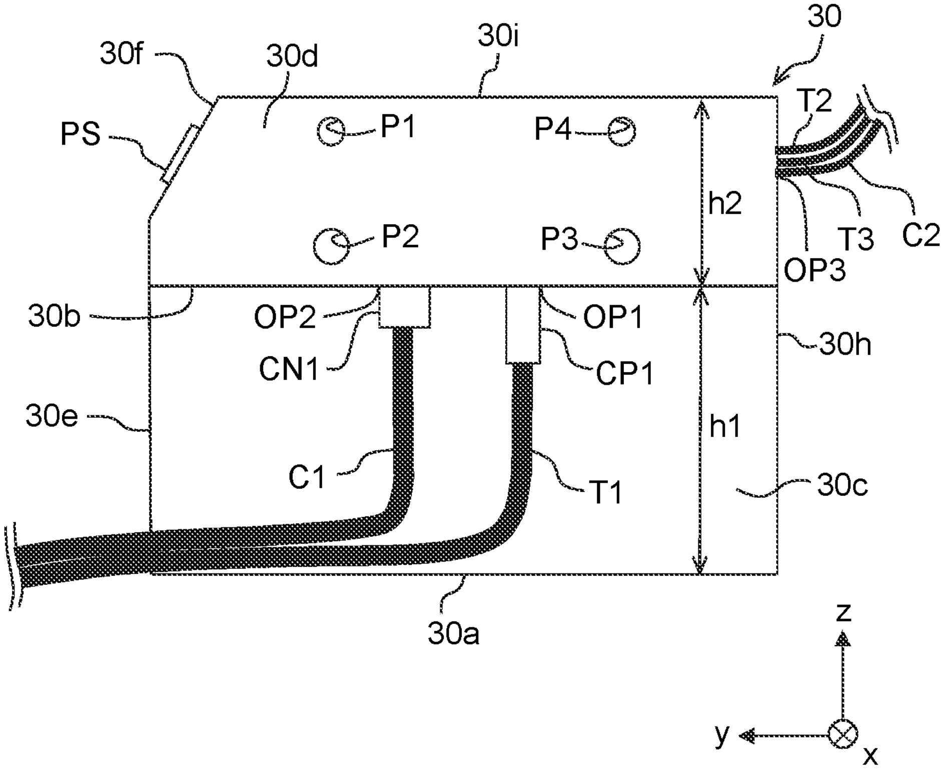
FIG. 4B is a side view of the tank unit.

Next, the details of the tank unit 30 will be explained, with reference to FIGS. 4A to 4D. As depicted in FIGS. 4A and 4B, the tank unit 30 has a bottom wall 30*a*, a bottom wall 30*b*, a side wall 30*c*, a side wall 30*d*, a side wall 30*e*, an inclined wall 30*f*, a side wall 30*g*, a side wall 30*h* and an upper wall 30*i*. Note that in FIG. 4C, in order to depict the internal configuration of the tank unit 30, the upper wall 30*i*, the inclined wall 30*f*, the side wall 30*e* and the side wall 30*g* are omitted from the illustration. Further, in FIG. 4D, in order to depict the internal configuration of the tank unit 30, the side wall 30*e* and the inclined wall 30*f* are omitted from the illustration.

The bottom walls 30*a*, 30*b* and the upper wall 30*i* each have a rectangular outer shape spreading or expanding in the x direction and the y direction. The bottom wall 30*b* is positioned on the one side in the z direction with respect to the bottom wall 30*a* (the upper side in FIG. 4A), and the upper wall 30*i* is positioned on the one side in the z direction with respect to the bottom wall 30*b*.

The side wall 30*c* has a rectangular outer shape spreading in the y direction and the z direction. An end part on the one side in the z direction (the upper side in FIG. 4A) of the side wall 30*c* is connected to an end part on the one side in the x direction (the left side in FIG. 4A) of the bottom wall 30*b*. An end part on the other side in the z direction (the lower side in FIG. 4A) of the side wall 30*c* is connected to an end part on the other side in the x direction (the right side in FIG. 4A) of the bottom wall 30*a*.

The side walls 30*d* and 30*g* each have a pentagonal shape which are parallel to a yz plane. An end part on the other side in the z direction (the lower side in FIG. 4A) of the side wall 30*d* is connected to an end part on the other side in the x direction of the bottom wall 30*b*. An end part on the one side in the z direction of the side wall 30*d* is connected to an end part on the other side in the x direction of the upper wall 30*i*. An end part on the other side in the z direction (the lower side in FIG. 4A) of the side wall 30*g* is connected to an end part on the one side in the x direction of the bottom wall 30*a*. An end part on the one side in the z direction of the side wall 30*g* is connected to an end part on the one side in the x direction of the upper wall 30*i*.

The side walls 30*e* and 30*h* each have a hexagonal outer shape which is parallel to a plane spreading in the x direction and the z direction. The side wall 30*e* is connected to the bottom walls 30*a* and 30*b*, an end part on the one side in the y direction (the front side in FIG. 4A) of the side wall 30*c*, and a part, of an end part on the one side in the y direction of each of the side walls 30*d* and 30*g*, which is parallel to the z direction. The side wall 30*h* is connected to an end part in the other side in the y direction (the far (rear) side in FIG. 4A) of each of the bottom walls 30*a* and 30*b*, and an end part on the other side in the y direction of each of the side walls 30*c*, 30*d* and 30*g*.

The inclined wall 30*f* has a rectangular outer shape, and is inclined with respect to the plane spreading in the x direction and the z direction. The inclined wall 30*f* is connected to an end part on the one side in the z direction of the side wall 30*e*, an end part on the one side in the y direction of the upper wall 30*i*, an inclined part, of an end part on the one side in the y direction of the side wall 30*d*, which is inclined with respect to the z direction, and an inclined part, of an end part on the one side in the y direction of the side wall 30*g*, which is inclined with respect to the z direction.

Figure 4C:
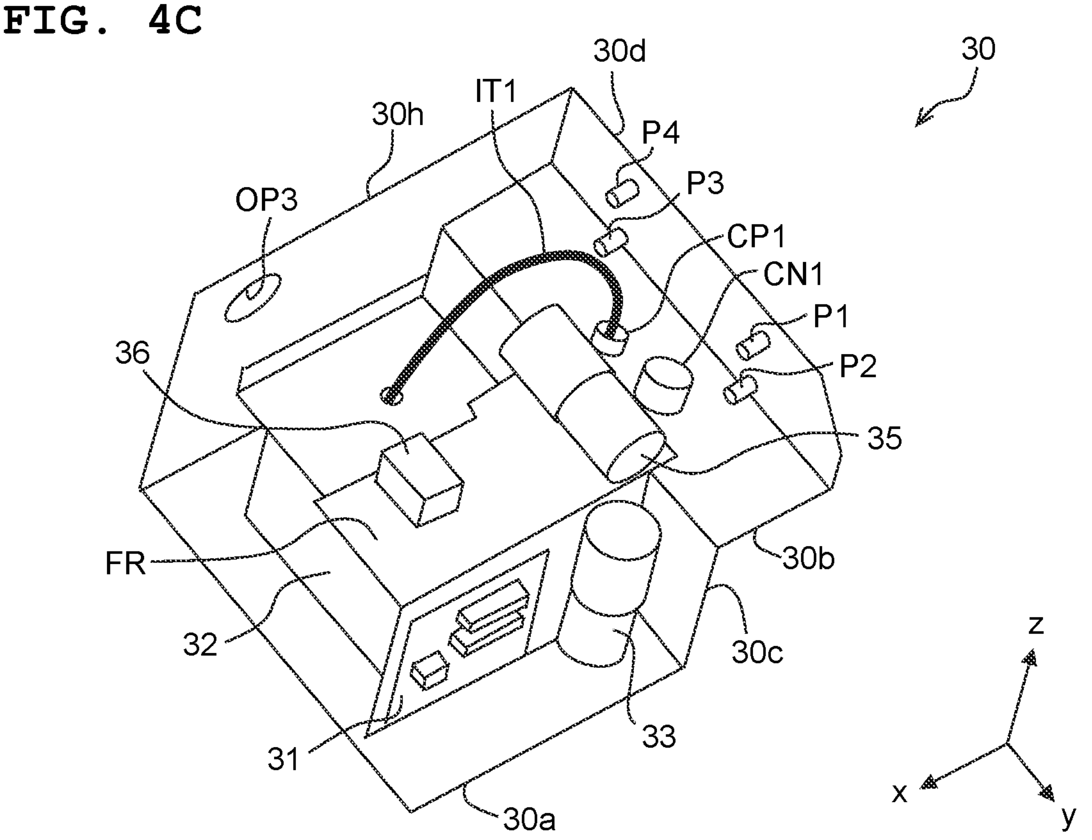
FIG. 4C is a perspective view depicting an internal configuration of the tank unit.

As depicted in FIG. 4C, the head tank 32, the relay substrate 31 and the circulation pump 33 are arranged on a surface on the one side in the z direction of the bottom wall 30*a*. The tube IT1, the tubes IT1 and IT2 (see FIG. 2) are connected to the head tank 32. Further, an end of the atmosphere communicating channel 37 (see FIG. 2) which extends in the z direction is connected to an end part on the one side in the z direction of the head tank 32, and the other end of the atmosphere communicating channel 37 is connected to another opening which is formed in the bottom wall 30*b* and which is different from openings OP1 and OP2. The relay substrate 31 has a rectangular outer shape spreading in the x direction and the z direction, and is positioned, in the y direction, between the head tank 32 and the side wall 30*e*. Further, the circulation pump 33 is also positioned, in the y direction, between the head tank 32 and the side wall 30*e*.

Figure 4D:
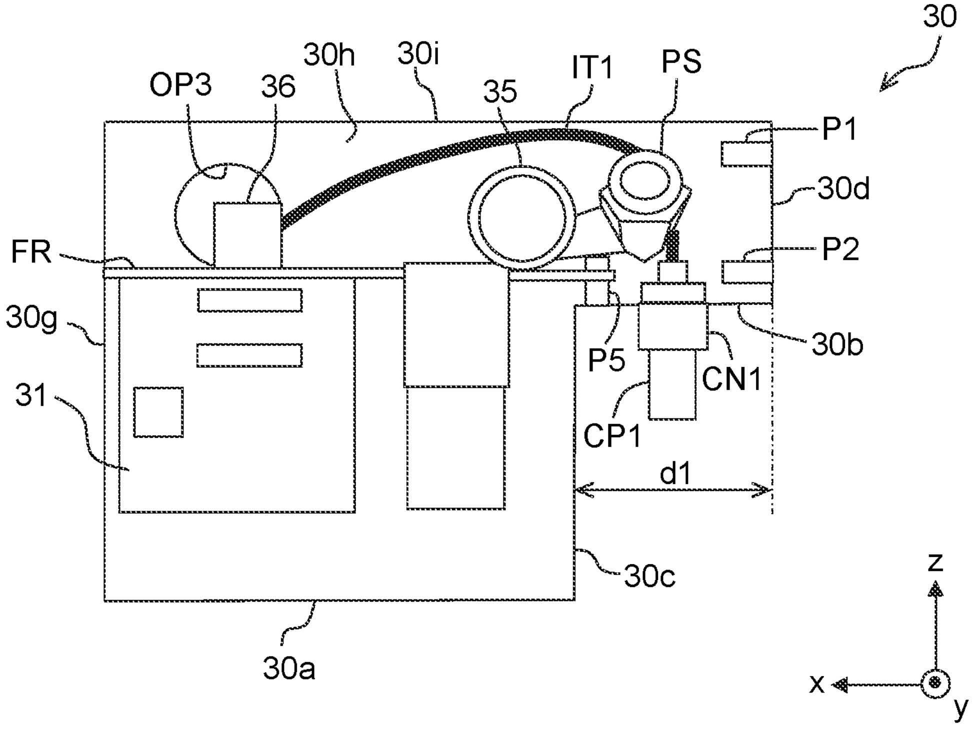
FIG. 4D is a front view depicting the internal configuration of the tank unit.

As depicted in FIG. 4B, the two openings OP1 and OP2 penetrating the bottom wall 30*b* in the z direction are formed in the bottom wall 30*b*. The coupler CP1 is positioned inside the opening OP1. One end of the coupler CP1 protrudes from the opening OP1 in the direction opposite to the z direction. The tube T1 is connected to the one end of the coupler CP1. Further, as depicted in FIG. 4C, the tube IT1 is connected to the other end of the coupler CP1. The connector CN1 is positioned inside the opening CP2. As depicted in FIG. 4B, one end of the connector CN1 protrudes in the direction opposite to the z direction. The wiring cable C1 is connected to the one end of the connector CN1. Further, the wiring cable W1 (see FIG. 3) is connected to the other end of the connector CN1. As depicted in FIGS. 4B and 4D, the coupler CP1 and the connector CN1 are arranged side by side in the y direction. Furthermore, as depicted in FIG. 4B, a length h1 in the z direction of the side wall 30*c*, in other words, a spacing distance in the z direction between the bottom wall 30*a* and the bottom wall 30*b* is greater than the minimum bending radius of the tube T1 connectable to the one end of the coupler CP1, and is greater than the minimum bending radius of the wiring cable C1 connectable to the one end of the connector CN1.

As depicted in FIGS. 4A to 4D, in the wide wall 30*d*, end parts of cylindrical parts P1 to P4, respectively, which extend in the x direction from the side wall 30*d* are opened. In other words, the four openings and the four cylindrical parts P1 to P4 extending from the four openings, respectively, in the x direction are formed in the side wall 30*d*. A female screw is formed inside each of the four cylindrical parts P1 to P4, and a male screw configured to fix the tank unit 30 to the rack R is inserted into each of the four cylindrical parts P1 to P4. As depicted in FIG. 4D, a length in the x direction of each of the four cylindrical parts P1 to P4 is shorter than a length d1 in the x direction of the bottom wall 30*b* (see FIG. 4D). In other words, the length d1 in the x direction of the bottom wall 30*b* is longer than the length in the x direction of each of the four cylindrical parts P1 to P4. Further, a length h2 in the z direction of the side wall 30*d* (see FIG. 4B), in other words, a spacing distance in the z direction from the bottom wall 30*b* to the upper wall 30*i*, is greater than the minimum bending radius of the tube IT1 connected to the other end of the coupler CP1.

As depicted in FIGS. 4A and 4B, a purge switch PS is provided, in the inclined wall 30*f*, on an area thereof on the one side in the z direction with respect to the bottom wall

30*b*, in other words, on the area overlapping with the bottom wall 30*b* in the z direction. In a case that the user presses or pushes the purge switch PS, the purge processing as described above is executed. Note that as depicted in FIGS. 4A and 4D, a length in the x direction of the purge switch PS is shorter than the length d1 in the x direction of the bottom wall 30*b*. In other words, the length d1 in the x direction of the bottom wall 30*b* is longer than the length in the x direction of the purge switch PS. Further, as depicted in FIG. 4D, the length d1 in the x direction of the bottom wall 30*b* is longer than a sum of the length in the x direction of the cylindrical part P1 and the length in the x direction of the purge switch PS, and is longer than a sum of the length in the x direction of the cylindrical part P2 and the length in the x direction of the purge switch PS.

As depicted in FIGS. 4B and 4C, an opening OP3 is formed in the side wall 30*h*. Further, the couplers CP2 and CP3 (see FIG. 2) and the connector CN2 (see FIG. 3) are provided inside the opening OP3. The tube IT2 (see FIG. 2) is connected to one end of the coupler CP2, and the tube T2 (see FIG. 2) is connected to the other end of the coupler CP2. The tube IT4 (see FIG. 2) is connected to one end of the coupler CP3, and the tube T3 (see FIG. 2) is connected to the other end of the coupler CP3. Further, the wiring cable W2 (see FIG. 3) is connected to one end of the connector CN2, and the wiring cable C2 (see FIG. 3) is connected to the other end of the connector CN2.

As depicted In FIG. 4C, a reinforcing frame FR spreading in the x direction and the y direction is provided on the inside of the tank unit 30. As depicted in FIG. 4D, a cylindrical part P5 extending in the z direction is formed in the bottom wall 30*b*; the reinforcing frame FR is fixed to the one side in the z direction with respect to the head tank 32, by a screw inserted into the cylindrical part P5. Further, as depicted in FIGS. 4C and 4D, the purge pump 35, the solenoid valve 36, etc., are arranged on a surface on the one side in the z direction of the reinforcing frame FR. The purge pump 35 is positioned, in the x direction, between an end part on the one side in the x direction of the bottom wall 30*b* and the atmosphere communicating channel 37 (see FIG. 2) extending in the z direction. Furthermore, as depicted in FIG. 4D, the length d1 in the x direction of the bottom wall 30*b* is longer than a sum of the length in the x direction of the cylindrical part P1, the length in the x direction of the purge switch PS and a length in the x direction of the cylindrical part P5, and is longer than a sum of a length in the x direction of the cylindrical part P2, the length in the x direction of the purge switch PS and the length in the x direction of the cylindrical part P5.

Figure 5A:
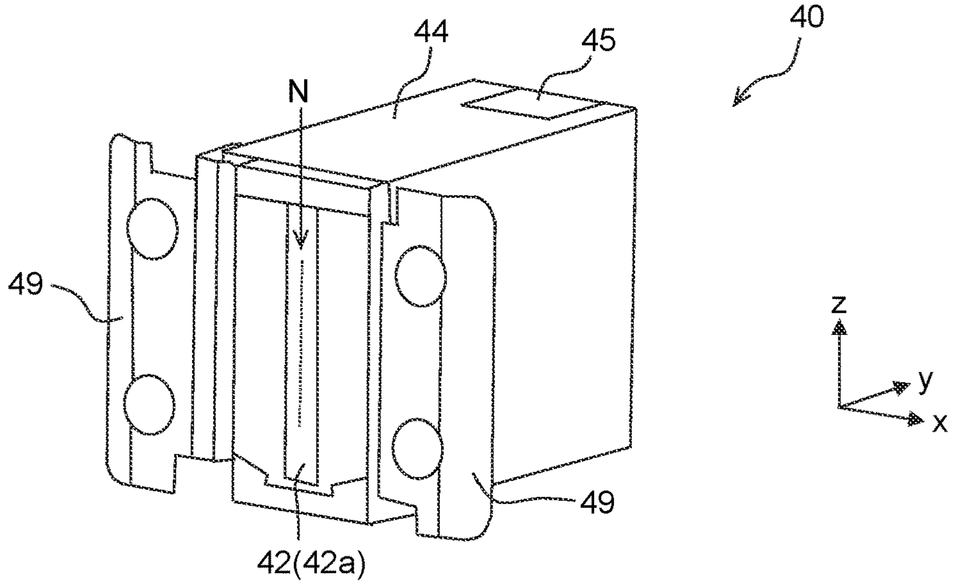
FIG. 5A is a perspective view of the head unit.

Next, the details of the head unit 40 will be explained, with reference to FIGS. 5A to 7B. As depicted in FIG. 5A, the head unit 40 is provided with the ink-jet head 42, a casing 44, an edge member 45 and a guide bracket 49. The ink discharge surface 42*a* of the ink-jet head 42 has a rectangular outer shape which is elongated in the z direction. Further, the nozzle row NR is formed, in the ink discharging surfacer 42*a*, by the plurality of nozzles aligned in the z direction. Namely, the nozzle row NR is formed along the z direction. Note that the illustration of the guide bracket 49 is omitted in FIGS. 5B to 6B.

Figure 5B:
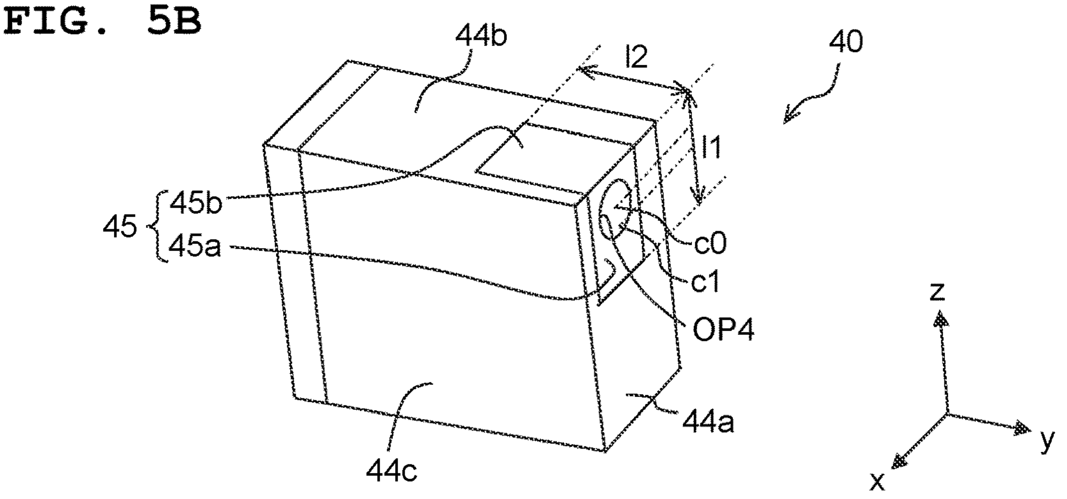
FIG. 5B is a perspective view of the head unit to which an edge member is attached in a first state.
Figure 5C:
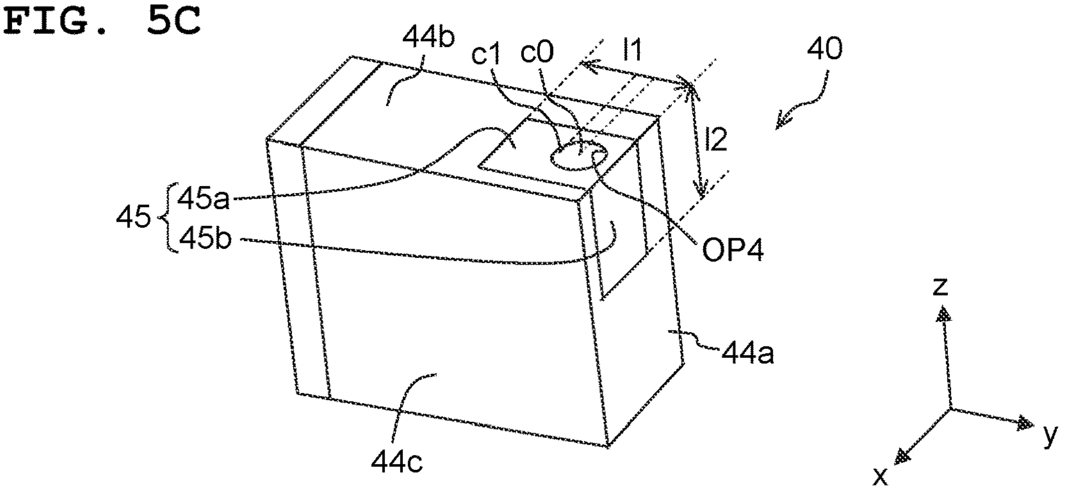
FIG. 5C is a perspective view of the head unit to which the edge member is attached in a second state.
Figure 5D:
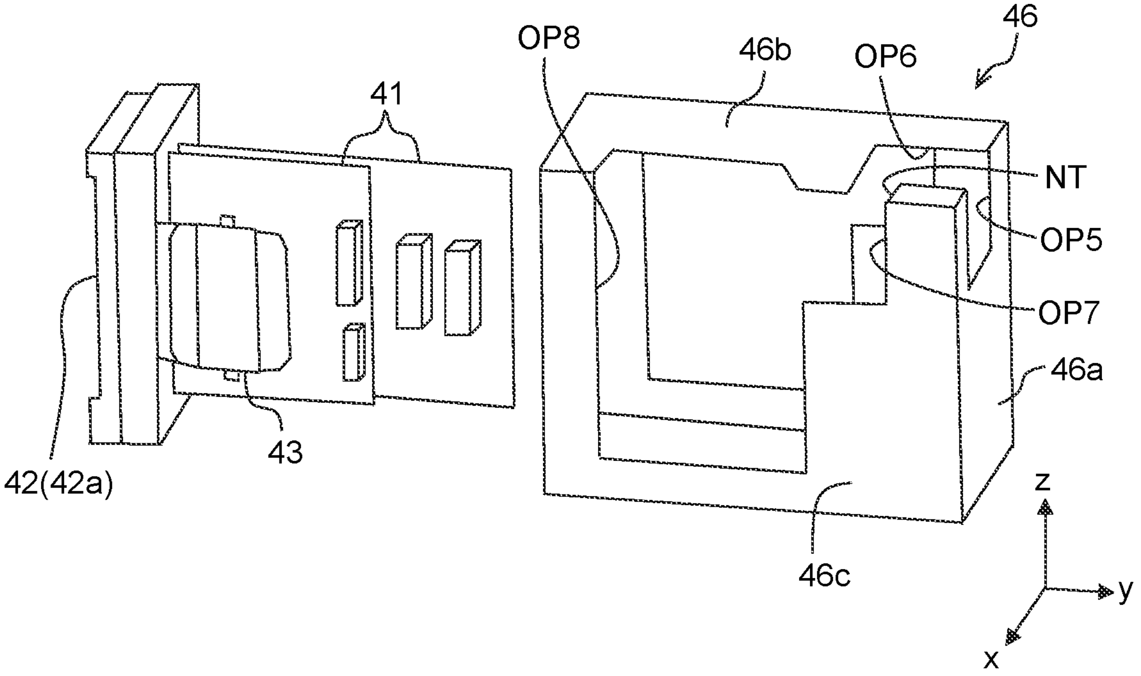
FIG. 5D is an exploded view depicting the inside of a casing of the head unit.

The casing 44 includes a frame 46 depicted in FIG. 5D, inside the casing 44; the driving substrate 41, the ink-jet head 42, the damper 43 are supported by the frame 46. As depicted in FIGS. 5B and 5C, the casing 44 has a side surface 44*a* on the one side in the y direction, a side surface 44*b* on the one side in the z direction, and a side surface 44*c* on the one side in the x direction. The side surface 44*a* spreads in the x direction and the z direction. The side surface 44*b* spreads in the x direction and the y direction. The side surface 44*c* spreads in the y direction and the z direction. Further, the edge member 45 which is detachably attachable with respect to the casing 44 is attached to a part, of the casing 44, to which the side surface 44*a* and the side surface 44*b* are connected.

As depicted in FIGS. 5B and 5C, the edge member 45 defines an opening OP4 through which the tubes T2 and T3 and the wiring cable C2 extending from the tank unit 30 are inserted into the head unit 40. The edge member 45 is attachable, with respect to the casing 44, selectively in a first state in which the opening OP4 faces (is oriented) in the y direction (the state in FIG. 5B) and a second state in which the opening OP4 faces in the z direction (the state in FIG. 5C). In a case that the head unit 40 is to be attached to the rack R in the horizontal posture depicted in FIG. 1A, the edge member 45 is attached to the casing 44 in the first state, thereby making it possible to route the tubes T2 and T3 and the wiring cable C2 without using a space on the one side in the z direction with respect to the head unit 40. On the other hand, in a case that the head unit 40 is to be attached to the rack R in the vertical posture depicted in FIG. 1B, the edge member 45 is attached to the casing 44 in the second state and then the ink discharge surface 42*a* is oriented or turned to face in the direction opposite to the z direction, thereby making it possible to route the tubes T2 and T3 and the wiring cable C2 without using a space on the one side in the z direction with respect to the head unit 40.

As depicted in FIGS. 5B and 5C, the edge member 45 has a first base part 45*a* in which the opening OP4 is formed, and a second base part 45*b* which extends from an end of the first base part 45*a* so as to be orthogonal to the first base part 45*a*. As depicted in FIG. 5B, in the first state, a length 11 in the z direction of the first base part 45*a* is same as a length 12 in the y direction of the second base part 45*b*. Further, as depicted in FIG. 5C, in the second state, the length 11 in the y direction of the first base part 45*a* is same as the length 12 in the z direction of the second base part 45*b*.

As depicted in FIG. 5D, the frame 46 includes a side surface 46*a* on the one side in the y direction, a side surface 46*b* on the one side in the z direction, and a side surface 46*c* on the one side in the x direction. The side surface 46*a* is parallel to a plane spreading in the x direction and the z direction. The side surface 46*b* is parallel to a plane spreading in the x direction and the y direction. The side surface 46*c* is parallel to a plane spreading in the y direction and the z direction. In a state that the head unit 40 is assembled, the side surfaces 46*a*, 46*b* and 46*c* of the frame 46 are covered, respectively, by the side surfaces 44*a*, 44*b* and 44*c* of the casing 44. As depicted in FIG. 5D, an opening OP5 facing in the y direction is formed in the side surface 46*a*, and an opening OP6 facing in the z direction is formed in the side surface 46*b*. An end part in the z direction of the opening OP5 and an end part in the y direction of the opening OP 6 are connected or linked. Further, a cutout NT facing in the z direction is formed in the side surface 46*b*. The cutout NT extends in the x direction from the opening OP6. An opening OP7 and an opening OP8 facing in the x direction are formed in an end part in the z direction of the side surface 46*c*. The opening OP7 is connected to the opening OP8 in the y direction, and a size in the y direction and a size in the z direction of the opening OP8 are greater than a size in the y direction and a size in the z direction of the opening OP7. Further, an end part in the z direction of the opening OP7 is connected to an end part in the x direction of the cutout NT of the side surface 46*b*.

Here, in a case of assembling the head unit 40, an operation of connecting the tube T2, the tube T3 and the wiring cable C2 extending from the tank unit 30, respectively, to the damper 43, the ink-jet head 42 and the driving substrate 41 of the head unit 40. In this case, it is possible to perform the operation by allowing the tube T2, the tube T3 and the wiring cable C2 to pass through the opening OP8 which is greater than the openings OP5, OP6 and OP7 and which is close to the damper 43 and the driving substrate 41 in a state that the head unit 40 is assembled. Accordingly, it is possible to improve the efficiency of a connecting operation of connecting the tube T2, the tube T3 and the wiring cable C2 extending from the tank unit 30, respectively, with respect to the damper 43, the ink-jet head 42 and the driving substrate 41 of the head unit 40. Further, after connecting the tube T2, the tube T3 and the wiring cable C2, respectively, with respect to the damper 43, the ink-jet head 42 and the driving substrate 41, the tube T2, the tube T3 and the wiring cable C2 are allowed to pass through, in an order of, the opening OP8, the opening OP7 and the cutout NT. Then, by pulling the tube T2, the tube T3 and the wiring cable C2 from the opening OP6 in the z direction, or from the opening OP5 in the y direction, it is possible to eliminate any looseness of the tube T2, the tube T3 and the wiring cable C2 inside the frame 46. As a result, it is possible to efficiently use the internal space of the frame 46.

Note that the opening OP5 is formed in a position at which the opening OP5 overlaps with the opening OP4 of the edge member 45 in the y direction in a case that the frame member 45 is attached to the casing 44 in the first state depicted in FIG. 5B. Further, the opening OP6 is formed in a position at which the opening OP6 overlaps with the opening OP4 of the edge member 45 in the z direction in a case that the frame member 45 is attached to the casing 44 in the second state depicted in FIG. 5C. Furthermore, in the first state, a center c0 in the z direction of the opening OP4 is positioned between a center c1 in the z direction of the first base part 45*a* and one end in the z direction of the first base part 45*a* (a connection part with respect to the second base part 45*b*), as depicted in FIG. 5B. Namely, the position of the opening OP4 in the first base part 45*a* is closer to the end part on the one side in the z direction of the first base part 45 than the end part on the other side in the z direction of the first base part 45*a*. Similarly, in the second state, the center c0 in the y direction of the opening OP4 is positioned between the center c1 in the y direction of the first base part 45*a* and the one end in the y direction of the second base part 45*a* (the connection part with respect to the second base part 45*b*), as depicted in FIG. 5C. Namely, the position of the opening OP4 in the first base part 45*a* is closer to the end part on the one side in the y direction of the first base part 45 than the end part on the other side in the y direction of the first base part 45*a*. Accordingly, in the frame 46, the size in the z direction of the opening OP5 and the size in the y direction of the opening OP6 can be suppressed to be minimum. As a result, after assembling the head unit 40, it is possible to make any foreign matter such as dust, etc., to be less likely to enter into the inside of the frame 46.

Figure 5E:
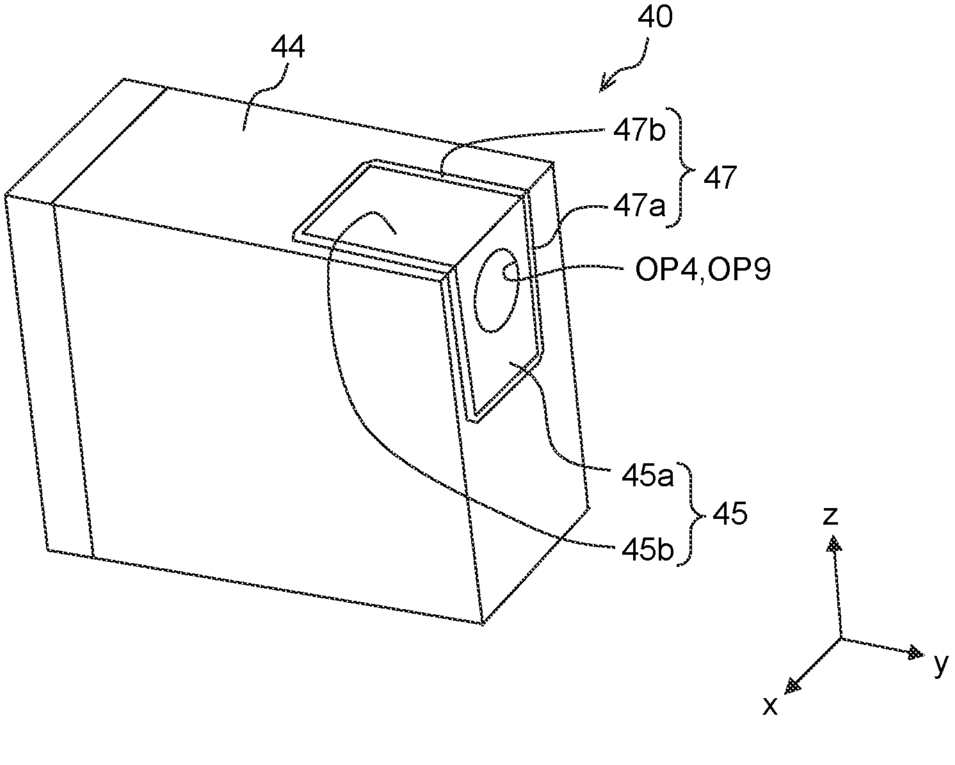
FIG. 5E is an enlarged view depicting a part, of the casing, to which the edge member is attached.

Further, as depicted in FIG. 5E, a sealer 47 which is formed, for example, of a sponge and which is a size larger than the edge member 45 is interposed between the casing 44 and the edge member 45 attached to the casing 44. The sealer 47 prevents the foreign matter such as the dust, etc., from entering into the inside of the frame 46 via a gap between the edge member 45 and the casing 44 and via the openings OP5, OP6 and OP7 of the frame 46, after the edge member 45 is attached to the casing 44. The sealer 47 has a first part 47*a* overlapping with the first base part 45*a* of the edge member 45, and a second part 47*b* overlapping with the second base part 45*b* of the edge member 45; an opening OP9 overlapping with the opening OP4 of the edge member 45 is formed in the first part 47*a*.

Figure 5F:
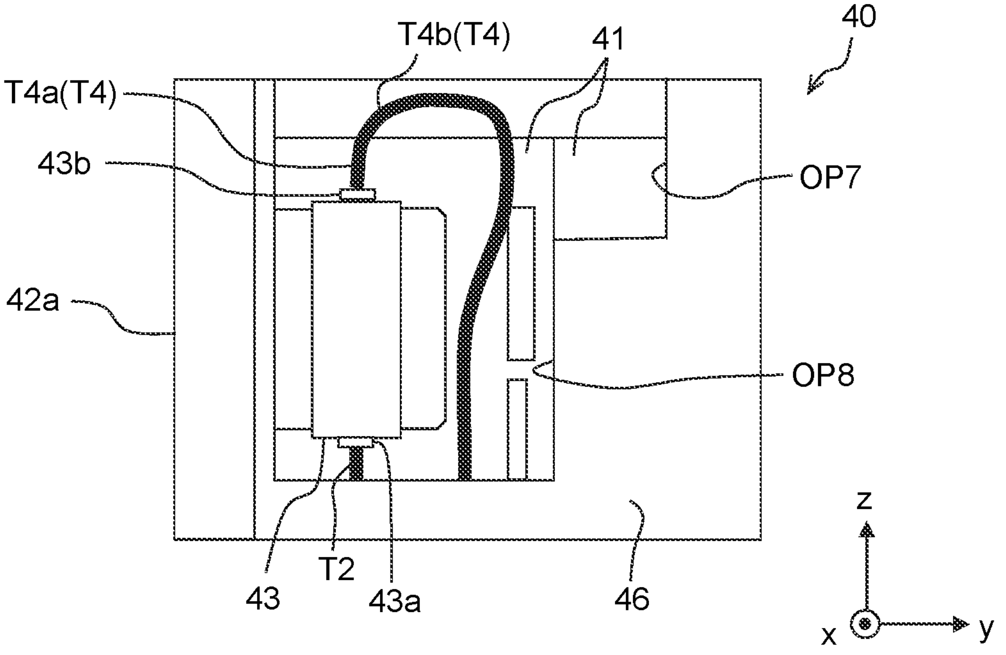
FIG. 5F is a view depicting an inside of the head unit in a horizontal posture.

As depicted in FIG. 5F, an inflow port 43*a* to which the tube T2 is connected is formed in an end part on the other side in the z direction of the damper 43. The ink flowing through the tube T2 flows into the inside of the damper 43 from the inflow port 43*a* of the damper 43. On the other hand, an outflow port 43*b* to which the tube T4 is connected is formed in an end part on one side in the z direction of the damper 43. The ink inside the damper 43 which flows out from the outflow port 43*b* is supplied to the ink-jet head 42 via the tube T4. Further, as depicted in FIG. 5F, the tube T4 has a first part T4*a* extending in the z direction from the outflow port 43*b* of the damper 43, and a second part T4*b* which is connected to an end part in the z direction of the first part T4*a* and which is curbed (bent) in the y direction.

Figure 5G:
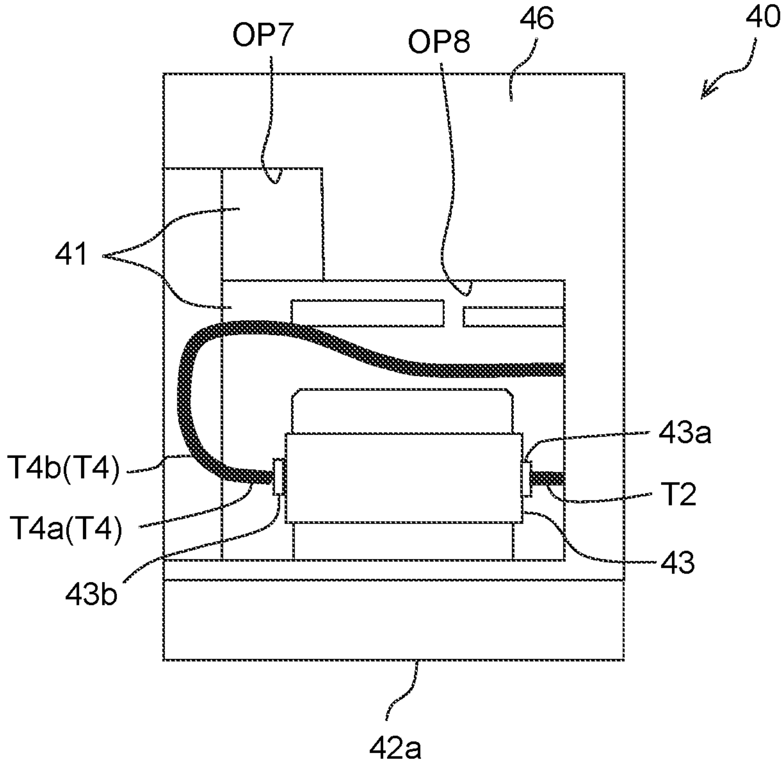
FIG. 5G is a view depicting the inside of the head unit in a vertical posture.

Here, in a case that the head unit 40 is used in the horizontal posture as depicted in FIG. 5F (namely, a case that the edge member 45 is attached to the casing 44 in the first state depicted in FIG. 5B), the outflow port 43*b* is positioned above the inflow port 43*a*, in the damper 43. Accordingly, at a time of initially introducing the ink, the ink is filled in the damper 43 from therebelow, and the air inside the damper 43 can be made to escape efficiently from the outflow port 43*b* located at the upper position. As a result, it is possible to prevent the air from remaining inside the damper 43 at the time of initially introducing the ink. On the other hand, in a case that the head unit 40 is used in the vertical posture as depicted in FIG. 5G (namely, in a case that the edge member 45 is attached to the casing 44 in the second state depicted in FIG. 5C), the second part T4*b* of the tube T4 is bent or curbed upward from the first part T4*a* connected to the outflow port 43*b* of the damper 43. Accordingly, at the time of initially introducing the ink, it is possible to make the air inside the damper 43 to escape to a location above the outflow port 43*b* by the first part T4*a* and the second part T4*b* of the tube T4. As a result, it is possible to prevent the air from remaining inside the damper 43 at the time of initially introducing the ink.

Figure 6A:
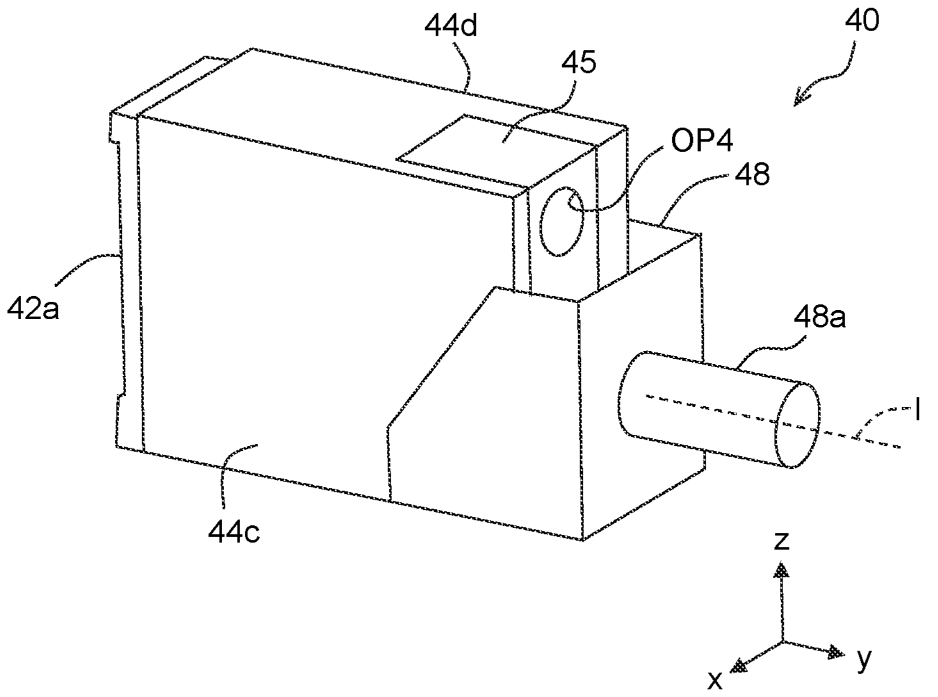
FIG. 6A is a perspective view of the casing to which a supporting member is attached.
Figure 6B:
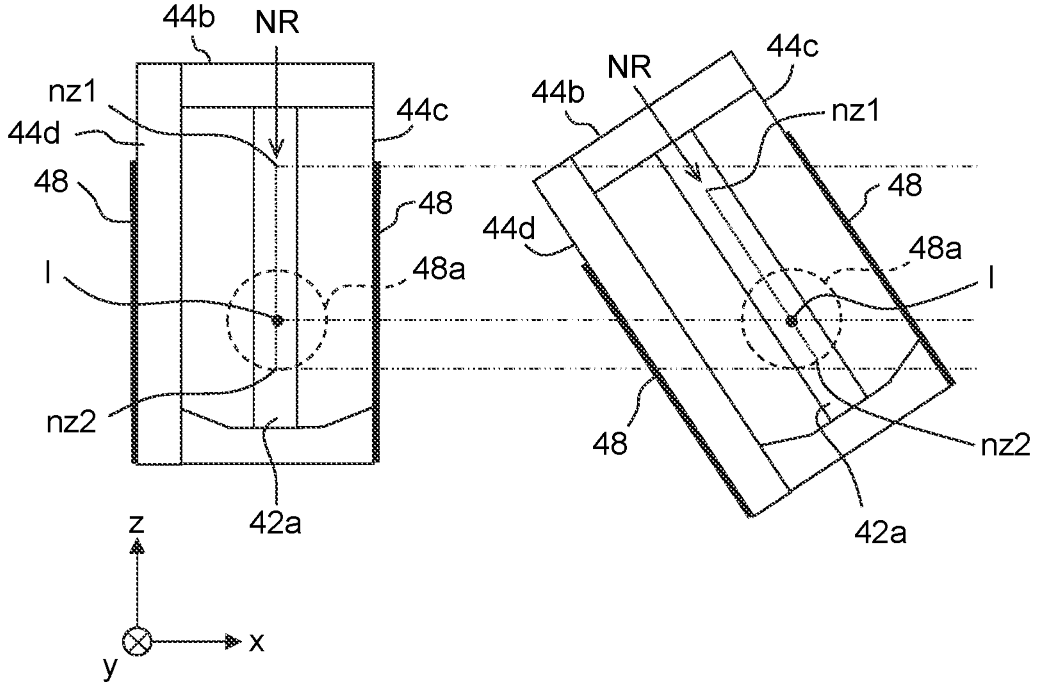
FIG. 6B is a view depicting the head unit in a state that a nozzle row is parallel to a z direction and depicting the head unit in a state that the head unit is inclined or tilted so that the nozzle row is inclined with respect to the z direction.

Although the foregoing explanation has been made on the premise that a conveyance surface of the conveyor CV is parallel to the xy plane, it is also conceivable that the conveyance surface of the conveyor CV is inclined with respect to the xy plane, depending on the service or usage environment of the ink-jet printer 10. For example, in FIG. 1A, such a case is conceivable that the conveyance surface of the conveyor CV is inclined such that as the print medium M is being conveyed in the x direction, the position of the print medium M is deviated in the z direction. In a case that printing is performed with respect to one side surface (a side surface parallel to the xz plane) of the print medium M in this situation, it is necessary to incline the head unit 40 so that the nozzle row NR is inclined with respect to the z direction while maintaining the head unit 40 to be at the horizontal posture. In such a case, the head unit 40 of the present embodiment may further include, for example, a supporting member 48 as depicted in FIG. 6A. As depicted in FIG. 6A, the supporting member 48 is attached to the side surface 44*c* and to the side surface 44*d* which faces or is opposite to the side surface 44*c* (see FIG. 6B), at an end part in the y direction (an end part on the opposite side with respect to the ink-jet head 42) of the casing 44. Further, the supporting member 48 has a shaft 48*a* extending in the y direction, and supports the casing 44 so that the casing 44 is rotatable, with a central axis I of the shaft 48*a* as the rotational axis. As depicted in a left view of FIG. 6B, in a case that the supporting member 48 supports the casing 44 so that the nozzle row NR is parallel to the z direction, the central axis I of the shaft 48*a* passes the center in the x direction in the ink-jet head 42, and passes a location between nozzles nz1 and nz2 which are, respectively, at the both ends in the nozzle row NR. Note that in the state that the nozzle row NR is parallel to the z direction, the nozzle nz21 is located at an end on the one side in the z direction, and the nozzle nz2 is located at an end on the other side in the z direction. Here, as depicted in a right view of FIG. 6B, the supporting member 48 is allowed to rotate, together with the casing 44, with the central axis I of the shaft 48*a* as the rotational axis, so as to incline the nozzle row NR with respect to the z direction. In this case, the position of the nozzle nz1 moves to the direction opposite to the z direction (the other side in the z direction), and the position of the nozzle nz2 moves to the z direction (the one side in the z direction). Accordingly, even in a case that the casing 44 is supported while being inclined so that the nozzle row NR is inclined with respect to the z direction, it is possible to maintain the head difference with respect to the water surface of the ink inside the head tank 32 within a predetermined range. Accordingly, it is possible to prevent such a situation that the head difference is broken due to that the casing 44 is supported while being inclined and that the ink flows out from the nozzles.

Next, the guide bracket 49 will be explained. The guide bracket 49 is provided so as to correct or rectify a conveying direction of the print medium M conveyed by the conveyor CV and to maintain a spacing distance from the ink discharge surface 42*a* to the print medium M to be constant, in a case that the print medium M, which is conveyed by the conveyor CV, is conveyed so as to approach toward the ink discharge surface 42*a* of the ink-jet head 42.

Figure 7A:
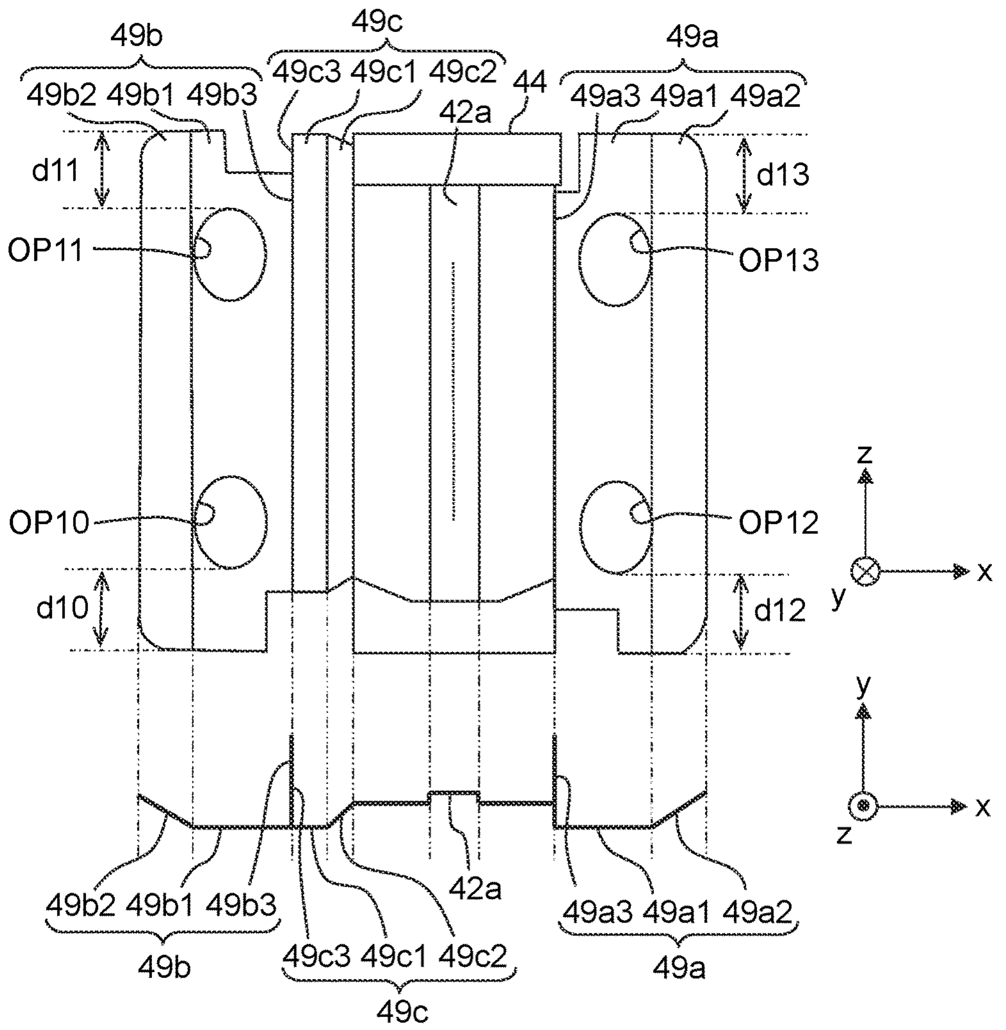
FIG. 7A is a front view of the casing to which a guide bracket is attached.
Figure 7B:
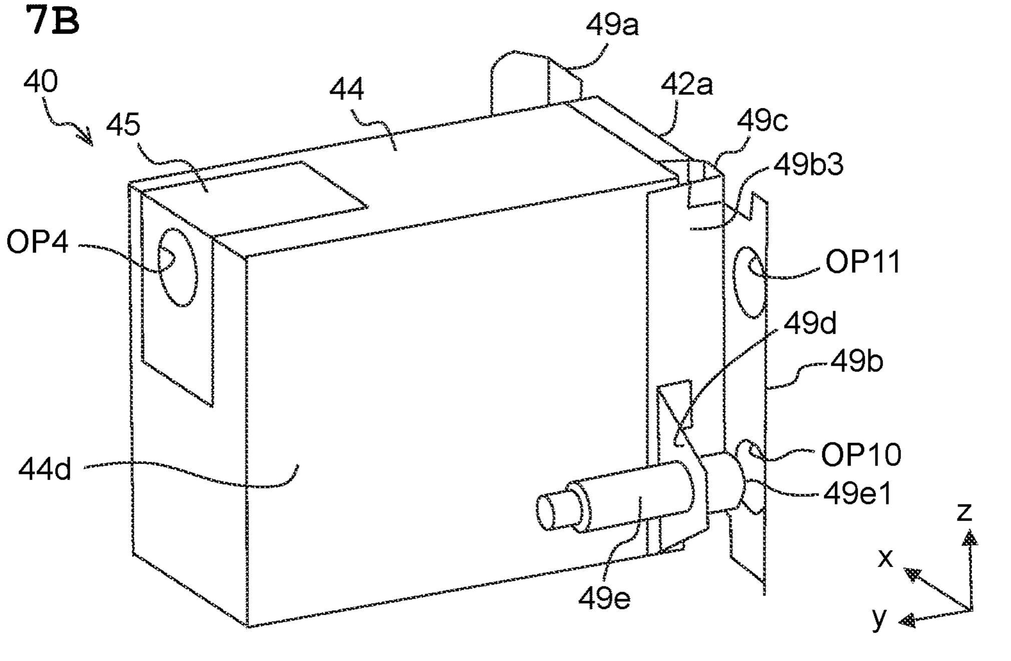
FIG. 7B is a perspective view of the casing to which the guide bracket is attached.

As depicted in FIGS. 7A and 7B, the guide bracket 49 is provided with a first guide 49*a*, a second guide 49*b*, a third guide 49*c*, a bracket 49*d* for a photocell sensor, and a photocell sensor 49*e*. The first guide 49*a*, the second guide 49*b* and the third guide 49*c* are supported by a part, of the casing 44, which is on the other side in the y direction (the right side in FIG. 7B). The first guide 49*a* is positioned on the one side in the x direction (the right side in FIG. 7A) with respect to the ink-jet head 42, and the second guide 49*b* is positioned on the other side in the x direction (the left side in FIG. 7A) with respect to the ink-jet head 42. Further, the third guide 49*c* is positioned, in the x direction, between the ink-jet head 42 and the second guide 49*b*.

The first guide 49*a* has a first guide surface 49*a*1 spreading in the x direction and the z direction, a first inclined surface 49*a*2 extending from an end part on the one side in the x direction of the first guide surface 49*a*1, and an attachment surface 49*a*3 extending toward the one side in the y direction from an end part on the other side in the x direction of the first guide surface 49*a*1. As depicted in a lower view of the FIG. 7A, the first guide surface 49*a*1 is positioned on the other side in the y direction with respect to the ink discharge surface 42*a*. Further, the first inclined surface 49*a*2 is connected to the end part on the one side in the x direction of the first guide surface 49*a*1 in a state that an end part on the other side in the x direction of the first inclined surface 49*a*2 is positioned on the other side in the y direction with respect to the end part on the one side in the x direction of the first inclined surface 49*a*2. Furthermore, the first guide surface 49*a* is attached to the casing 44 via the attachment surface 49*a*3. The first guide surface 49*a*1 is formed with two openings OP12 and OP13 penetrating the first guide surface 49*a*1 in the y direction. The openings OP12 and OP13 have a same shape, and are arranged side by side in the z direction. A distance d13 from an end part on the one side in the z direction of the first guide surface 49*a*1 to an end part on the one side in the z direction of the opening OP13 is equal to a distance d12 from an end part on the other side in the z direction of the first guide surface 49*a*1 to an end part on the other side in the z direction of the opening OP12. Note that it is allowable that a length in the z direction of the first guide 49*a* is not more than a length in the z direction of the casing 44.

The second guide 49*b* has a second guide surface 49*b*1 spreading in the x direction and the z direction, a second inclined surface 49*b*2 extending from an end part on the other side in the x direction of the second guide surface 49*b*1, and an attachment surface 49*b*3 extending toward the one side in the y direction from an end part on the one side in the x direction of the second guide surface 49*b*1. As depicted in the lower view of FIG. 7A, the second guide surface 49*b*1 is positioned on the other side in the y direction with respect to the ink discharge surface 42*a*. Further, the second inclined surface 49*b*2 is connected to the end part on the other side in the x direction of the second guide surface 49*b*1 in a state that an end part on the one side in the x direction of the second inclined surface 49*b*2 is positioned on the other side in the y direction with respect to the end part on the other side in the x direction of the second inclined surface 49*b*2. Furthermore, the second guide surface 49*b* is attached to the casing 44 via the attachment surface 49*b*3. The second guide surface 49*b*1 is formed with two openings OP10 and OP11 penetrating the second guide surface 49*b*1 in the y direction. The openings OP10 and OP11 have a same shape, and are arranged side by side in the z direction. A distance d11 from an end part on the one side in the z direction of the second guide surface 49*b*1 to an end part on the one side in the z direction of the opening OP11 is equal to a distance d10 from an end part on the other side in the z direction of the second guide surface 49*b*1 to an end part on the other side in the z direction of the opening OP10. Note that it is allowable that a length in the z direction of the second guide 49*b* is not more than the length in the z direction of the casing 44.

The third guide 49*c* has a third guide surface 49*c*1 spreading in the x direction and the z direction, a third inclined surface 49*c*2 extending from an end part on the one side in the x direction of the third guide surface 49*c*1, and an attachment surface 49*c*3 extending toward the one side in the y direction from an end part on the other side in the x direction of the third guide surface 49*c*1. As depicted in the lower view of FIG. 7A, the third guide surface 49*c*1 is positioned on the other side in the y direction with respect to the ink discharge surface 42*a*. Further, the third inclined surface 49*c*2 is connected to the end part on the one side in the x direction of the third guide surface 49*c*1 in a state that an end part on the other side in the x direction of the third inclined surface 49*c*2 is positioned on the other side in the y direction with respect to the end part on the one side in the x direction of the third inclined surface 49*c*2. Furthermore, the third guide surface 49*c* is attached to the casing 44 via the attachment surface 49*c*3. Note that it is allowable that a length in the z direction of the third 49*c* is not more than the length in the z direction of the casing 44.

As depicted in FIG. 7B, the bracket 49*d* for the photocell sensor is attached to the attachment surface 49*b*3 of the second guide 49*b*. Further, the photocell sensor 49*e* is supported by the bracket 49*d* for the photocell sensor. The photocell sensor 49*e* is provided with a light receiving element 49*e*1 configured to detect approaching, to the head unit 40, of the print medium M which is being conveyed by the conveyor CV. In a state that the photocell sensor 49*e* is supported by the bracket 49*d* for the photocell sensor, the light receiving element 49*e*1 is positioned on the other side in the y direction in the photocell sensor 49*e*. Further, as seen in the y direction from the other side in the y direction, a light receiving surface of the light receiving element 49*e*1 is positioned inside the opening OP10 of the second guide 49*b*.

As explained above, in the present embodiment, the first guide 49*a* is provided on the one side in the x direction with respect to the ink-jet head 42, and the second guide 49*b* and the third guide 49*c* are provided on the other side in the x direction with respect to the ink-jet head 42. Further, in a case that the conveying direction of the print medium M is the direction opposite to the x direction of FIG. 7A, the first guide 49*a* has the first inclination surface 49*a*2 which is further inclined in a direction away from the ink discharge surface 42*a* (the direction opposite to the y direction) as advancing further toward the downstream side in the conveying direction of the print medium M (the direction opposite to the x direction). On the other hand, in a case that the conveying direction of the print medium M is the x direction of FIG. 7A, the second guide 49*b* has the second inclination surface 49*b*2 which is further inclined in a direction away from the ink discharge surface 42*a* (the direction opposite to the y direction) as advancing further toward the downstream side in the conveying direction of the print medium M (the x direction). Furthermore, each of the first guide surface 49*a*1 and the second guide surface 49*b*1 is positioned on the other side in the y direction with respect to the ink discharge surface 42*a*. Accordingly, in a case that the print medium M which is being conveyed by the conveyor CV is conveyed so as to approach toward the ink discharge surface 42*a* of the ink-jet head 42, the conveying direction of the print medium M is corrected by the inclined surface on the upstream side in the conveying direction and the guide surface continued from the inclined surface, thereby making it possible to maintain the spacing distance from the ink discharge surface 42*a* to the print medium M to be constant. Further, also in a case that the print medium M is being conveyed in the x direction by the conveyor CV, and in a case that the print medium M is conveyed in the direction opposite to the x direction by the conveyor CV, it is possible to guide the print medium M to an appropriate position.

Further, the third guide 49*c* is present between the ink-jet head 42 and the second guide 49*b*. Furthermore, the third guide 49*c* has the third inclined surface 49*c*2 between the ink-jet head 42 and the third guide surface 49*c*1. Accordingly, in a case that the print medium M is being conveyed in the direction opposite to the x direction by the conveyor CV and that the conveying direction is deviated to the y direction after the print medium M has passed the ink-jet head 42, it is possible to guide the print medium M to the direction opposite to the y direction by the third inclined surface 49*c*2. As a result, it is possible to avoid the occurrence of such a situation that the print medium M which has passed the ink-jet head 42 collides against the second guide 49*b* and that the conveyance of the print medium M is thereby stopped.

As described above, in the present embodiment, each of the first guide 49*a*, the second guide 49*b* and the third guide 49*c* has the length in the z direction which is not more than the length in the z direction of the casing 44. Accordingly, it is possible to suppress any increase in the size in the z direction of the head unit 40.

Note that in the present embodiment, the first guide 49*a* and the second guide 49*b* have a same shape. Namely, in a case that the first guide 49*a* is rotated by 180 degrees along the first guide surface 49*a*1, the outer shape of the first guide 49*a* is coincident with the outer shape of the second guide 49*b*. Further, as depicted in the upper view of FIG. 7A, in a state that the first guide 49*a* and the second guide 49*b* are attached to the casing 44, the first guide 44*a* and the second guide 44*b* are in a relationship of point symmetry, with respect to a point in the center in the x direction and the point in the center in the z direction which are positioned therebetween. Accordingly, it is possible to make the parts used as the first guide 49*a* and the second guide 49*b* to be common.

In the head unit 40 of the present embodiment as explained above, the x direction, the y direction and the z direction are examples, respectively, of a "second direction", a "third direction" and a "first direction". The ink discharge surface 42*a* is an example of a "nozzle surface". The damper 43 is an example of a "tank". The openings OP5, OP6, OP7 and OP8 are examples, respectively, of a "first hole", a "second hole", a "third hole" and a "fourth hole". The side surfaces 46*a*, 46*b* and 46*c* of the frame 46 are examples, respectively, of a "first side surface", a "second side surface", and a "third side surface".

Although the embodiment of the present teaching has been explained in the foregoing, the present teaching is not limited to or restricted by the above-described embodiment, and various design changes can be made within the scope of the claims.

In the above-described embodiment, although the opening OP4 is formed in the edge member 45, the present teaching is not limited to or restricted by this. For example, it is allowable to form a cylindrical part which protrudes in the y direction from the first base part 45*a* in the first state of FIG. 5B. In this case, a forward end of the cylindrical part corresponds to the opening of the edge member 45.

In the above-described embodiment, although the first guide 49*a* is provided on the one side in the x direction with respect to the ink-jet head 42, and the second guide 49*b* and the third guide 49*c* are provided on the other side in the x direction with respect to the ink-jet head 42, the present teaching is not limited to this. For example, the third guide 49*c* may not be provided. Alternatively, for example, in a case that the conveying direction of the print medium M is the direction opposite to the x direction, it is allowable that at least the first guide 49*a* is provided. On the other hand, in a case that the conveying direction of the print medium M is the x direction, it is allowable that at least the second guide 49*b* is provided. Namely, it is allowable that the guide is provided, with respect to the ink-jet head 42, at least on the upstream side in the conveying direction of the print medium M.

What is claimed is:

1. A head unit comprising:

a head having a nozzle surface spreading in a first direction and a second direction crossing the first direction, the nozzle surface having a nozzle row formed along the first direction;

a tank fluidly connected to the head;

a substrate electrically connected to the head;

a casing containing the head, the tank and the substrate; and an edge member defining an opening through which a tube and a wiring pass, the tube being fluidly connectable to the tank, the wiring being electrically connectable to the substrate, the edge member being configured to be detachably attachable with respect to the casing, wherein the edge member is configured to be attachable with respect to the casing selectively in a first state and a second state, the first state being a state in which the opening faces in a third direction crossing the first direction and the second direction, the second state being a state in which the opening faces in the first direction.

2. The head unit according to claim 1, wherein the edge member has a first base part defining the opening, and a second base part extending from an end of the first base part so as to cross the first base part, and in the first state, a length along the first direction of the first base part is same as a length along the third direction of the second base part.

3. The head unit according to claim 2, wherein the casing includes a frame supporting the head, the tank and the substrate, the frame defines a first hole and a second hole, in a case that the edge member is attached with respect to the casing in the first state, the first hole overlaps with the opening of the edge member in the third direction, and in a case that the edge member is attached with respect to the casing in the second state, the second hole overlaps with the opening of the edge member in the first direction.

4. The head unit according to claim 3, wherein an end part in the first direction of the first hole is connected to an end part in the third direction of the second hole.

5. The head unit according to claim 4, wherein in the first state, a center in the first direction of the opening is located between a center in the first direction of the first base part and the end of the first base part.

6. The head unit according to claim 3, wherein the frame has a first side surface defining the first hole, a second side surface defining the second hole, and a third side surface crossing the first side surface and the second side surface, the second side surface further defines a cutout extending from the second hole in the second direction, and the third side surface defines a third hole connected to the cutout of the second side surface, at an end part in the first direction of the third side surface.

7. The head unit according to claim 3, further comprising a sealer interposed between the edge member and the casing in a state that the edge member is attached with respect to the casing.

8. The head unit according to claim 7, wherein the sealer has a first part overlapping with the first base part of the edge member, and a second part overlapping with the second base part of the edge member, and the first part of the sealer defines a fourth hole overlapping with the opening of the edge member.

9. The head unit according to claim 1, further comprising a supporting member having a shaft extending in the third direction, the supporting member being configured to support the casing such that the casing is rotatable with a central axis of the shaft as a rotation axis, wherein in a state that the supporting member supports the casing such that the nozzle row is parallel to the first direction, the central axis of the shaft passes a center in the second direction of the head.

10. The head unit according to claim 9, wherein in the state that the supporting member supports the casing such that the nozzle row is parallel to the first direction, the central axis of the shaft passes between both ends of the nozzle row.

11. The head unit according to claim 1, wherein in a posture, of the head unit, in which the first direction is along a vertical direction, a lower end of the tank defines an inflow port of liquid to be supplied to the head, and an upper end of the tank defines an outflow port, of the liquid, which is connected to the head via a tube, and in the posture of the head unit in which the first direction is along the vertical direction, the tube has a first part extending from the outflow port in the first direction, and a second part connected to the first part and curved in the third direction.

12. The head unit according to claim 1, wherein the edge member has a cylindrical part extending in the third direction in the first state, and an end of the cylindrical part is the opening.

13. A printing system comprising:

an ink supplying device; and the head unit as defined in claim 1 which is connected to the ink supplying device and to which ink is supplied from the ink supplying device.

14. A printing method comprising:

conveying a print medium by a conveyor; and causing the printing system as defined in claim 13 to discharge ink onto the print medium conveyed by the conveyor.

15. A printing method comprising:

conveying a print medium by a conveyor; and causing the head unit as defined in claim 1 to discharge ink onto the print medium conveyed by the conveyor.

* * * * *